April 26, 1949.   F. E. WILEY   2,468,697
METHOD OF DEEP DRAWING ORGANIC PLASTIC SHEETS
Filed June 1, 1944   2 Sheets-Sheet 1
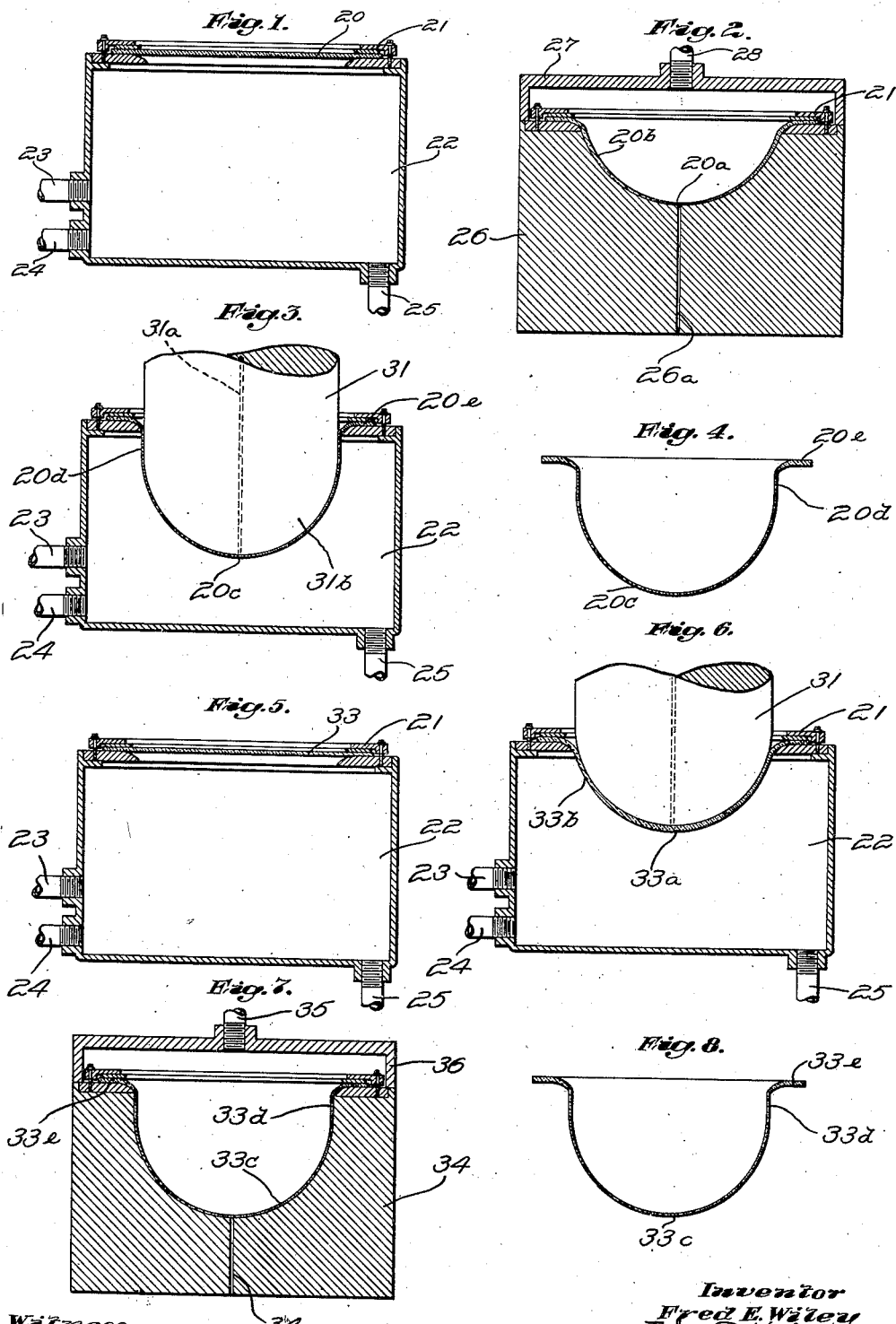
Witness
W. B. Thayer
Inventor
Fred E. Wiley
by John R. Hobson
Attorney April 26, 1949.  F. E. WILEY  2,468,697
METHOD OF DEEP DRAWING ORGANIC PLASTIC SHEETS
Filed June 1, 1944  2 Sheets-Sheet 2
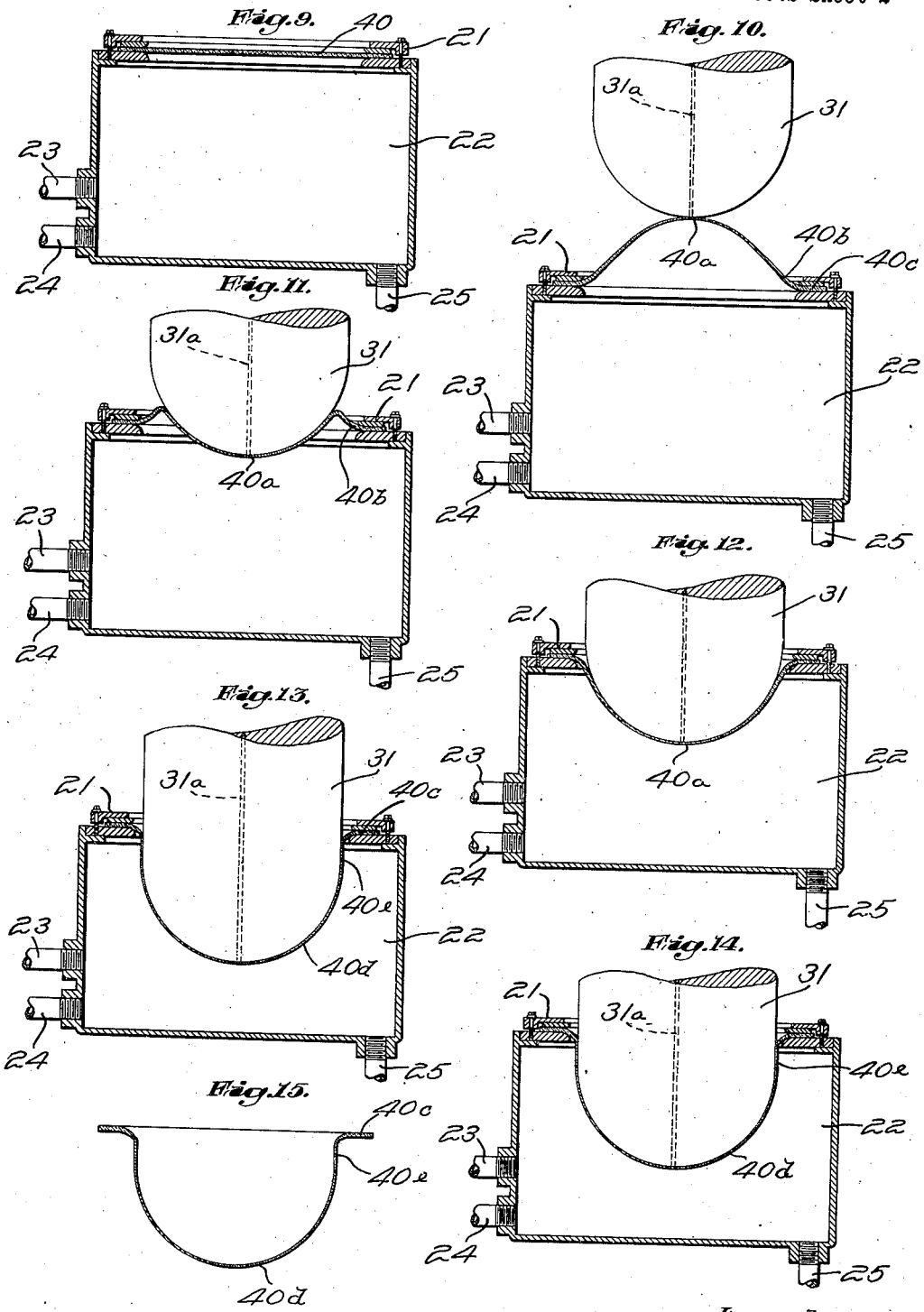
Inventor
Fred E. Wiley
by John R. Hobson
Attorney
Witness
W. B. Thayer Patented Apr. 26, 1949

2,468,697

UNITED STATES PATENT OFFICE 2,468,697

METHOD OF DEEP DRAWING ORGANIC PLASTIC SHEETS

Fred E. Wiley, West Hartford, Conn., assignor to Plax Corporation, Hartford, Conn., a corporation of Delaware Application June 1, 1944, Serial No. 538,297

15 Claims. (Cl. 18—56)

This invention relates to deep drawing sheet of organic plastic material, such as polystyrene, cellulose acetate, ethyl cellulose, vinyl chloride or acetate and other organic thermoplastic materials. The invention relates particularly to forming relatively large shapes by deep drawing.

Although various methods of drawing organic plastic sheet have been proposed, there has been no satisfactory method devised, so far as I know, by the use of which deep drawn articles can be formed with walls of uniform thickness or in which the wall thickness can be controlled.

When a sheet of organic plastic material is heated and a hollow shape formed therein by ordinary methods the plastic stretches unevenly and therefore will tear or break if the forming operation is continued long enough. This tearing or breaking may occur before an article of the desired depth is formed and if not, an undesirable variation in wall thickness will result.

I have invented or discovered a novel method whereby the distribution of plastic in forming hollow shapes may be so controlled as to form shapes of uniform wall thickness or of a variable thickness in which the degree and location of differences in thickness can be predetermined or controlled. This novel method makes possible unusually deep drawing or forming of relatively large hollow shapes.

The novel method comprises the combination of forming operations which, if separately employed, would result in uneven and possibly ruptured shapes but when combined according to this invention or discovery so compensate each other that the wall thickness may be controlled surprisingly well.

In order that the invention may be fully understood and its various advantages appreciated, reference should be had to the accompanying drawings in which various modes of applying the novel method in actual practice are illustrated and in which drawings:

Figs. 1 to 3 inclusive show certain steps in one form of the method which may be used to produce the hollow article shown in Fig. 4;

Figs. 5 to 7 inclusive illustrate a variation in the method of Figs. 1 to 3, for producing the article shown in Fig. 8; and Figs. 9 to 14 inclusive depict another series of steps of the novel method for forming the article shown in Fig. 15.

As stated above, the novel method comprises the combination of certain steps which, if utilized separately, would have the undesirable result of non-uniform wall thickness and possible rupture of the plastic. As the description of the illustrated embodiments proceeds, it will be pointed out how the separate steps or method of blowing sheet into a female die or of blowing the sheet without a die causes undesirable thinning or rupture at the apex or bottom of the shape and undesirably thick walls at or near the rim or top of the shape; and how the use of a plunger or male die has the opposite effect, namely, undue thickening at the apex or bottom of the shape and undesirably thinning and possibly rupture at or near the rim or top of the shape.

Considering now the figures, Fig. 1 shows a sheet 20 of organic plastic material secured in a clamping ring 21 on heating chamber 22. The clamping ring holds the margin of the sheet tightly and prevents it from slipping throughout all forming operations on the sheet. Chamber 22 has a steam inlet 23, an air inlet 24 and an exhaust pipe 25 all of which are used as explained below and are provided with suitable control valves, not shown.

Steam is admitted to the chamber 22 to heat the sheet 20 and when it has been heated, the ring 21 with the sheet therein is quickly transferred to the top of a female die 26, Fig. 2, a blowhead 27 placed on the die and steam and/or warm air admitted to the blowhead through pipe 28. This further heats the sheet 20 and blows or expands it into the cavity of the die to the initial hollow form shown, the die cavity being vented through duct 26a. The shape and depth of the die cavity is selected to form the initial shape to a predetermined variable wall thickness in which the plastic is so distributed that the initial shape can be formed into a deeper article of uniform wall thickness as described below.

The undesirable effect of forming a hollow article by steps such as those so far described is demonstrated by the unduly thin bottom portion or apex of the shape at 20a graduating to the undesirably thick upper wall portion at 20b, the variation in wall thickness being apparent although somewhat exaggerated for purposes of illustration. In blowing a shape of about 17 inches maximum internal diameter, as in Fig. 2, from sheet which initially is about 10 thousandths of an inch thick, the variation in thickness of the resulting shape may be of the order of 3 thousandths of an inch or more, or approximately 33% or more.

In the shape in Fig. 2 should be further expanded in the above described manner to form a deeper article, the difference in thickness would become even greater and the thin portion might tear or rupture. However, I have surprisingly found that such a shape can be formed much deeper without such undesirable effects as follows. The clamping ring with the shape therein is placed on the heating chamber 22, Fig. 3, and again heated by steam to proper forming temperature to compensate for the cooling action of die 26. Preferably before the heating operation is started, a plunger 31 is placed in the hollow shape to preserve the initial shape during the reheating. The plunger has a vent 31a and a semispherical end 31b and in the illustrated method is quickly pushed into the initial shape, after reheating it, a sufficient predetermined distance to produce a final shape of uniform wall thickness having a semispherical portion 20c, and a cylindrical wall portion 20d of substantial length, this constituting unusually deep drawing. Preferably, the steam inlet is cut off before the plunger acts to draw the shape to its final form.

The additional drawing to such unusual depth appears to be mostly at the expense of the thicker portion 20b of the initial shape of Fig. 2, the plunger so acting upon the initial shape that the plastic is uniformly distributed and the wall is of surprisingly uniform thickness. Thus an article can be formed such as shown in Fig. 3 with very little, if any, variation in wall thickness. The variation in thickness in the final article of Fig. 4 may easily be made less than 2 to 3 tenths of a thousandth of an inch.

When the plunger has reached its lowermost position, compressed air is admitted to chamber 22, the steam pressure being shut off and the exhaust opened by valves, not shown, controlling flow through pipes 23, 24 and 25. Cool air then passes through chamber 22 and chills the sheet so that the plunger can be withdrawn without danger of recovery forces in the plastic impairing or distorting the final shape. When the air has been cut off and exhausted from chamber 22, the shape may be removed from the clamping ring as it is shown in Fig. 4 and flange 20e trimmed off.

In Figs. 5 to 7, the method is varied by reversing the order of drawing and blowing. A sheet 33, Fig. 5, is heated in clamping ring 21 on chamber 22 as before and is initially shaped by plunger 31 as shown in Fig. 6. The plunger is lowered into the shape a predetermined amount to form an initial shape the wall of which is of predetermined variable thickness and in which the plastic is so distributed that an article of uniform wall thickness will be produced as described below.

The effect of initially forming the sheet by means of the plunger is the reverse of blowing, the shape being thickest in the bottom or apex as shown at 33a and thinnest in the upper side wall portion as shown at 33b. Such variation in thickness may be as much as 50%. Here again, continuation of the forming operation would either increase the variation in thickness or tear or rupture the plastic in the upper side wall portion 33b. To prevent this and to make a deeper shape of uniform wall thickness, the clamping ring is placed on a female die 34 having vent 34a and reheated and expanded therein by steam and/or warm air applied through pipe 35 of blowhead 36. The cavity of die 26 is of a depth and shape selected to form the article with a wall of very uniform thickness. Further expansion appears to be mostly at the expense of the thicker portion 33a of the initial shape because the final shape has a surprisingly uniform wall thickness comprising the semispherical portion 33c and cylindrical portion 33d with flange 33e thereon. The pressure of the warm fluid in the die is lowered gradually and replaced by cool air to chill and set the plastic article in its final form which is then removed from the die as shown in Fig. 8. It may then be trimmed.

Figs. 9 to 14 inclusive illustrate a mode of carrying out the invention wherein the initial shape is formed by blowing the sheet without using a die. Fig. 9 shows the sheet 40 in clamping ring 21 being heated by steam and/or air supplied to chamber 22. The steam softens the sheet and expands it into a hollow initial shape as shown in Fig. 10, this shape being thinnest at the apex or bottom 40a and thickest at the top side portion 40b having flange 40c thereon and the distribution of the plastic in the shape being predetermined to produce a shape of uniform wall thickness when made deeper as described below. The extent of expansion may be measured by the position of plunger 31 held over the chamber 22 at the proper level. The variation in thickness shows that if the expansion should be continued, the sheet would soon burst at 40a or become much more uneven in thickness. To obtain a deeper shape without this occurring, the shape is first reversed and then drawn deeper by lowering plunger 31 therein a predetermined and limited distance, the pressure in chamber 22 being lowered if necessary to permit this.

Fig. 11 shows the reversal of the initial shape partly completed and Fig. 12 the reversal completed with the plunger in the initially formed hollow shape. Plunger 31 is now quickly lowered to the position shown in Fig. 13 to impart the final shape comprising the semispherical portion 40d and cylindrical wall portion 40e having flange 40c thereon. The final forming operation serves to eliminate the inequalities in thickness of the initial shape, the final wall thickness being unexpectedly uniform.

The final shape is cooled by cutting off the steam inlet while admitting compressed air and opening the exhaust to replace the warm fluid with cool air. The plunger can then be removed without danger of distortion of the shape.

In the various forms of the method described above a forming member or die is used against only one side of the plastic sheet or initial shape, this avoiding certain difficulties which would result if complementary male and female members were used together in carrying out a given forming operation. Also this has the advantage of eliminating the cost of one of such members. In all cases, the plastic sheet is held against slipping in the clamping ring 21.

It will be clear from the above description that in each form of the novel method, the plastic is distributed in the initial shape in a predetermined manner so that when the shape is deepened a predetermined amount, an article is formed having a uniform wall thickness. The final wall thickness may be made exactly equal to or less than the minimum thickness of the initial shape.

Although the method as illustrated and described results in an article of uniform wall thickness, the novel method includes the production of articles of varying wall thickness but in which the amount and location of variations are predetermined and controlled. For example, the initial shape formed in Fig. 10 may be overblown or extended so that the thin bottom or apex portion 40a is made thinner by a predetermined amount such that the corresponding portion of the finished article of Fig. 15 will be thinner than other portions by a predetermined amount.

While each form of the method illustrated and described comprises essentially a single blowing step followed by a single drawing step or vice versa, it will be understood additional steps may be used preferably alternating between blowing and die or plunger forming to control the wall thickness and distribution of plastic in the walls of the final article. In this way, articles may be drawn to very unusual depths.

Other changes or variations may be made in the manner in which the method is performed and in the apparatus for carrying it out without departing from the scope of the appended claims.

Having described the invention or discovery, what I claim is:

1. The method of deep forming articles in sheet of organic plastic material which comprises initially heating such sheet until sufficiently soft to be made hollow, expanding the sheet into overall surface engagement with the wall of a die cavity to form an initial hollow shape of uneven thickness by applying fluid pressure to said sheet, disassociating the initial hollow shape from the wall of the die cavity and stretching said initial shape into a deeper article of substantially uniform thickness by means of a plunger.

2. The method of forming hollow articles from sheet of organic plastic material which comprises holding such sheet against slipping in a clamping device, heating said sheet until sufficiently soft to be made hollow, forming an initial hollow shape of variable wall thickness in said sheet by forcing a plunger into the sheet, cooling said initial shape while holding the plunger therein, heating and removing the plunger, applying fluid pressure to the initial shape to expand it into a die cavity and thus form it into a deeper article of uniform wall thickness, and cooling the material while holding the article in its final shape.

3. The method of deep drawing articles in sheet of organic plastic material which comprises holding such sheet against slipping in a clamping device, heating said sheet until sufficiently soft to be stretched, expanding said sheet into an initial hollow form in one direction by fluid pressure, reversing said initial shape and forming it into a deeper shape by inserting a plunger therein, cooling the deeper shape while holding the plunger therein, and removing the plunger.

4. The method of deep drawing articles in sheet of organic plastic material which comprises holding said sheet against slipping in a clamping device, heating said sheet until sufficiently soft to be stretched by applying a heating fluid thereto, expanding said sheet into an initial hollow form of predetermined depth by fluid pressure, relieving said pressure and expanding said initial hollow form into a much deeper shape of substantially uniform thickness by inserting a plunger therein and applying pressure only with said plunger, and cooling the deeper shape while holding the plunger therein.

5. The method of forming a sheet of organic plastic material into a deep drawn article of substantially uniform thickness, which method includes drawing both by pressure exerted on the sheet by an hemispherically shaped plunger and by fluid pressure acting on the sheet, said method comprising the steps of, applying one of the aforesaid pressures to said sheet in such manner as to draw said sheet to a predetermined depth and predetermined varying wall thickness, thereby forming an initial hollow shape, relieving the pressure and applying the other of the aforesaid pressures to said hollow shape in such a manner as to exert a greater stretch on the thicker portions of the wall of said hollow shape, whereby the wall thickness is rendered substantially uniform and a much deeper shape is formed.

6. The method of stretching sheets of expandible material to form pockets of generally uniform thickness including partially forming the pocket to a predetermined depth by fluid pressure with the center of the pocket substantially free whereby it is stretched more than the remaining portion of the pocket, relieving the fluid pressure and thereafter enlarging the pocket to a much greater depth by mechanical pressure applied through contact with one side only of the center portion of the wall of the pocket and in the absence of restraint on the opposite side of said wall portion whereby the remaining portion of the pocket is stretched to approximately the same thickness as the center.

7. The method of forming a pocket in a sheet of extensible material which comprises applying fluid pressure to a portion of said sheet, having its center free, to form an initial pocket of predetermined depth, the wall of said initial pocket having its central portion stretched more than the remainder thereof, and thereafter applying mechanical pressure to one side only of the wall of the initial pocket through contact with the central portion of said wall to stretch the remainder of said wall a greater amount than the central portion and form a deeper final pocket, and maintaining at least a major portion of the other side of the wall out of forming contact with any solid surface during the application of said mechanical pressure.

8. The method of forming a pocket in a sheet of extensible material which comprises applying fluid pressure to a portion of said sheet, having its center free, to form an initial pocket of predetermined depth having its central portion stretched more than the remainder thereof, discontinuing the fluid pressure stretching and thereafter applying mechanical pressure to the wall of the initial pocket through contact with the central portion of said wall to stretch the remainder of said wall a greater amount than the central portion and form a deeper final pocket of much greater depth.

9. The method of forming a pocket in a sheet of extensible material including partially forming the pocket to a first depth by fluid pressure applied to the sheet with the center of the pocket substantially free, relieving the fluid pressure and enlarging the pocket to a much greater ultimate depth with mechanical pressure applied through contact with the sheet at the center portion of the partially formed pocket.

10. The method of forming a pocket in a sheet of extensible material which comprises applying fluid pressure to a portion of said sheet, having its center free, to stretch and form an initial pocket wall of predetermined depth which is stretched progressively less from its center outwardly and thereafter, discontinuing the fluid pressure stretching, applying mechanical pressure to one side of the initial pocket wall through a forming member while increasing the contact of the member with the wall progressively from a thinner to a thicker portion to stretch a thicker portion of the initial pocket wall a greater amount than thinner portion and form a pocket of substantially uniform thickness having a much greater depth than the initial pocket, and maintaining at least a major portion of the other side of the wall out of forming contact with any solid surface during the application of said mechanical pressure.

11. The method of forming a pocket in a sheet of extensible material including forming said pocket by fluid pressure acting on said sheet and by pressure mechanically exerted on said sheet, said method comprising forming an initial pocket by one of said pressures, and reversing said pocket and forming a deeper shape by the other of said pressures.

12. The method of forming a pocket in a sheet of extensible material which comprises forming said sheet into an initial hollow pocket by fluid pressure and reversing said initial pocket and forming it into a deeper pocket by pressure mechanically exerted on said initial pocket.

13. The method of forming a pocket in a sheet of extensible material which method includes pressing said sheet into contact with a mold cavity wall by fluid pressure, dissassociating the sheet from the wall of the mold cavity and further forming said sheet by pressing a member into the same portion of the sheet and forming a deeper pocket.

14. The method of forming a hollow shape of plastic sheet which comprises applying fluid pressure directly to the sheet to form an initial hollow shape of predetermined depth and progressively thinner wall to its crown, and shaping said initial hollow shape into a deeper hollow shape of more uniform thickness by pressure mechanically exerted on the inside only of the wall of the initial hollow shape, and maintaining at least a major portion of the outside of the wall out of forming contact with any solid surface during the application of said mechanical pressure, said applications of fluid and mechanical pressures each being limited to definite predetermined portions of the total deformation of the sheet into the deeper shape.

15. The method of forming a pocket in a sheet of material, which method includes expanding said sheet solely by fluid pressure into an initial pocket of predetermined depth, relieving said fluid pressure and forming said initial pocket to a substantially greater depth solely by mechanically applied pressure.

FRED E. WILEY.

REFERENCES CITED

The following references are of record in the file of this patent:

UNITED STATES PATENTS

| Number | Name | Date |
|---|---|---|
| 673,982 | Hamet | May 14, 1901 |
| 1,535,354 | Steele et al. | Apr. 28, 1925 |
| 2,142,445 | Helwig | Jan. 3, 1939 |
| 2,289,668 | Mallory | July 14, 1942 |

Certificate of Correction

Patent No. 2,468,697.  April 26, 1949.

FRED E. WILEY

It is hereby certified that errors appear in the printed specification of the above numbered patent requiring correction as follows:

Column 2, line 52, for the words "In the" read *If the*; column 5, lines 36 and 37, strike out "heating and" and insert the same before "applying", line 37, same column; and that the said Letters Patent should be read with these corrections therein that the same may conform to the record of the case in the Patent Office.

Signed and sealed this 8th day of November, A. D. 1949.

[SEAL]

THOMAS F. MURPHY,
*Assistant Commissioner of Patents.*